United States Patent
Pouliot

(10) Patent No.: US 7,725,922 B2
(45) Date of Patent: May 25, 2010

(54) SYSTEM AND METHOD FOR USING SANDBOXES IN A MANAGED SHELL

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 873 days.

(21) Appl. No.: 11/384,264

(22) Filed: Mar. 21, 2006

(65) Prior Publication Data

US 2007/0226773 A1 Sep. 27, 2007

(51) Int. Cl.
*H04L 29/00* (2006.01)

(52) U.S. Cl. .......................... 726/1; 713/201; 709/202; 709/208

(58) Field of Classification Search ....................... 726/1; 713/201; 709/202, 208
See application file for complete search history.

(56) References Cited

U.S. PATENT DOCUMENTS

| | | | |
|---|---|---|---|
| 5,452,457 A | 9/1995 | Alpert et al. ................ 395/700 |
| 6,071,316 A | 6/2000 | Goossen et al. ................ 717/4 |
| 6,230,312 B1 | 5/2001 | Hunt ............................. 717/4 |
| 6,282,701 B1 | 8/2001 | Wygodny et al. .............. 717/4 |
| 6,308,275 B1 * | 10/2001 | Vaswani et al. ................ 726/2 |
| 6,560,774 B1 | 5/2003 | Gordon et al. .............. 717/146 |
| 6,615,264 B1 | 9/2003 | Stoltz et al. ................. 709/202 |
| 6,802,054 B2 | 10/2004 | Faraj .......................... 717/128 |
| 6,871,284 B2 | 3/2005 | Cooper et al. ............... 713/200 |
| 6,971,091 B1 | 11/2005 | Arnold et al. ............... 717/145 |
| 7,069,554 B1 | 6/2006 | Stammers et al. ........... 717/178 |
| 7,487,221 B2 * | 2/2009 | Araki ......................... 709/208 |
| 7,512,965 B1 | 3/2009 | Amdur et al. .................. 726/1 |
| 7,552,472 B2 | 6/2009 | Baffes et al. ................. 726/22 |
| 7,620,940 B2 | 11/2009 | Goldsmith et al. .......... 717/127 |
| 2002/0042897 A1 | 4/2002 | Klein et al. ................. 714/718 |
| 2002/0069200 A1 | 6/2002 | Cooper et al. ................. 707/9 |
| 2002/0198675 A1 | 12/2002 | Underseth et al. ........... 702/122 |
| 2003/0041267 A1 * | 2/2003 | Fee et al. .................... 713/201 |
| 2003/0065942 A1 | 4/2003 | Lineman et al. ............. 713/201 |
| 2003/0110192 A1 | 6/2003 | Valente et al. .............. 707/513 |
| 2003/0115484 A1 | 6/2003 | Moriconi et al. ............ 713/201 |
| 2003/0177355 A1 | 9/2003 | Elgressy et al. ............. 713/167 |
| 2003/0196114 A1 * | 10/2003 | Brew et al. .................. 713/201 |
| 2003/0225822 A1 * | 12/2003 | Olson et al. ................. 709/202 |
| 2004/0103323 A1 | 5/2004 | Dominic ..................... 713/202 |

(Continued)

OTHER PUBLICATIONS

Clark, Jason, "Return of the Rich Client—Code Access Security and Distribution Features in .NET Enhance Client-Side Apps", *MSDN Magazine*, printed from http://msdn.microsoft.com/msdnmag/issues/02/06/rich/default.aspx, Jun. 2002, 16 pages.

(Continued)

*Primary Examiner*—Nasser Moazzami
*Assistant Examiner*—Ghazal Shehni
(74) *Attorney, Agent, or Firm*—Pillsbury Winthrop Shaw Pittman LLP

(57) ABSTRACT

The present invention allows shell program to be managed with security policies and enforced using sandboxes enforced by the security manager of a managed environment. The additional security policies may come from shell tool specific security policies, application specific security policies, resource based security policies, shell based policies, owner based policies, user based policies and/or other types of policies. Security policies may be merged to provide a managed shell more permission granularity in addition to existing machine policies.

20 Claims, 3 Drawing Sheets

U.S. PATENT DOCUMENTS

| | | | |
|---|---|---|---|
| 2004/0250112 A1 | 12/2004 | Valente et al. | 713/200 |
| 2005/0071668 A1 | 3/2005 | Yoon et al. | 713/200 |
| 2005/0172126 A1 | 8/2005 | Lange et al. | 713/166 |
| 2005/0240999 A1* | 10/2005 | Rubin et al. | 726/22 |
| 2005/0262517 A1 | 11/2005 | French | 719/316 |
| 2006/0064737 A1 | 3/2006 | Wallace | 726/1 |
| 2006/0117299 A1 | 6/2006 | Goldsmith et al. | 717/124 |
| 2006/0143396 A1 | 6/2006 | Cabot | 711/134 |
| 2006/0150021 A1 | 7/2006 | Traskov et al. | 714/37 |
| 2006/0235655 A1 | 10/2006 | Qing et al. | 702/186 |

OTHER PUBLICATIONS

Mono, "Mono:Runtime—The Mono Runtime", printed from http://www.mono-project.com/Mono:Runtime, Jan. 24, 2006, 8 pages.

Mono, "Assemblies and the GAC—How Mono Finds Assemblies", printed from http://www.mono-project.com/Assemblies_and_the_GAC, Jul. 20, 2005, 11 pages.

Meier, J.D., et al., "How To: Perform a Security Code Review for Managed Code (Baseline Activity)", printed from http://msdn.microsoft.com/library/en-us/dnpag2/html/paght000027.asp?frame=true, Microsoft Corporation, Oct. 2005, 13 pages.

Alcazar, Mark, "Windows Presentation Foundation Security Sandbox", MSDN Library, Microsoft Corporation, printed from http://msdn.microsoft.com/library/en-us/dnlong/html/wpfsecuritysandbox.asp?frame=true, Sep. 2005, 9 pages.

Novell AppArmor Powered by Immunix 1.2 Installation and QuickStart Guide, Sep. 29, 2005, 18 pages.

Zone Labs "Technical Support Tech Notes: Protection Against Advanced Firewall Bypass Techniques", printed from http://www.zonelabs.com/store/content/support/technote, Aug. 23, 2006, 3 pages.

Zone Labs "Zone Labs PASS Program" printed from http://www.zonelabs.com/store/company/partners/passFAZ.jsp, Aug. 23, 2006, 1 page.

Damianou, Nicodemos C., "A Policy Framework for Management of Distributed Systems", Thesis, Imperial College of Science, Technology and Medicine, University of London, Department of Computing, Feb. 2002, 233 pages.

Oaks, Scott, "Java Security, $2^{nd}$ Edition", Publisher O'Reilly Media, Inc., May 17, 2001, 22 pages.

Sundmark et al., "Monitored Software Components — A Novel Software Engineering Approach", *Proceedings of the $11^{th}$ Asia-Pacific Software Engineering Conference* (APSEC'04), Nov. 30-Dec. 3, 2004, pp. 624-631.

Sokolsky et al., "Steering of Real-Time Systems Based on Monitoring and Checking", *Proceedings of the Fifth International Workshop*, Nov. 18-20, 1999, pp. 11-18.

\* cited by examiner

SYSTEM AND METHOD FOR USING SANDBOXES IN A MANAGED SHELL

FIELD OF INVENTION

The invention is a system and method for executing a managed shell program and more particularly dynamically creating a sandbox environment for implementing security policies for the secure execution of shell tools and resources.

BACKGROUND

Shell programs are commonly known in the art as a way of commanding a computer to execute certain actions. Shell programs may be graphical or text based. Shell tools may include the actual shell commands like list (ls), move (mv), and remove (rm), among others. A shell script may be a series of shell commands stored in a file and executed until the end of the file is reached. Shell commands can access critical resources within a computer. Current shell security uses the security offered by the operating system of the computer, which is mostly user identity-based (e.g. user A can access the file B, while user C cannot).

With the proliferation of downloading programs, scripts, and other data from the Internet or third party sources, there is a need for limiting access to internal computer resources from potentially malicious downloads. An operating system security based on user identity is not enough because a user may unknowingly execute malicious codes and/or scripts. This is a drawback because a program is executed in the security context of its user, therefore, the program has all the permissions associated with the user identity (e.g. user A execute program X which maliciously access file B).

SUMMARY

Various aspects of the invention overcome at least some of these and other drawbacks of known systems. According to one object of the invention, an operating system may execute a shell script in a managed environment (e.g., a Java or ECMA virtual machine) and then by recognizing one or more shell tools; identifying one or more security policies related to the one or more shell tools; and dynamically creating a sandbox for enforcing the identified security policies to the managed shell during execution. Security policies may come from tool specific security policies, application specific security policies, resource based security policies, shell based policies, owner based policies, user based policies and/or other types of policies. The one or more security policies adds permissions granularity to a managed shell.

The invention provides security by creating a sandbox for a command or script to be executed using a managed shell. The security manager of the managed environment will enforce the security policy established, from different sources, by the managed shell. A sandbox is an isolated execution environment and safe place for running semi-trusted programs or scripts, often originating from a third party. It is a restricted environment in which certain functions are prohibited. Security policies can additionally limit the kind of actions performed during execution within a sandbox. For example, deleting files and modifying system information such as registry settings and other control panel functions may be prohibited within a sandbox. This allows security policies to be enforced for application and application resources that are not being executed.

According to another object of the invention, a managed shell execution may include identifying the managed shell security policy; recognizing one or more of the shell tools during runtime; recognizing one or more custom permissions of the managed shell; identifying a shell tool security policy for each of the one or more recognized shell tools; and merging the one or more identified shell tool security policies and the identified managed shell security policy and the one or more identified custom permissions; and enforcing the merged policies in a dynamically created sandbox execution. Two or more different security policies may be merged with one or more permissions and enforced during execution in the sandbox.

These objects increase the security on the actions that may be performed by a shell scripts or programs originating from various unknown sources. These and other objects, features and advantages of the invention will be apparent through the detailed description of the embodiments and the drawings attached hereto. It is also to be understood that both the foregoing general description and the following detailed description are exemplary and not restrictive of the scope of the invention.

DETAILED DESCRIPTION

One aspect of the invention is based on a shell executed under a managed environment 18. This managed shell can dynamically create sandboxed environments before the execution of shell commands or scripts. The sandboxes are configured to support one or more security policies that may be enforced by a security manager 20.

Figure 1:
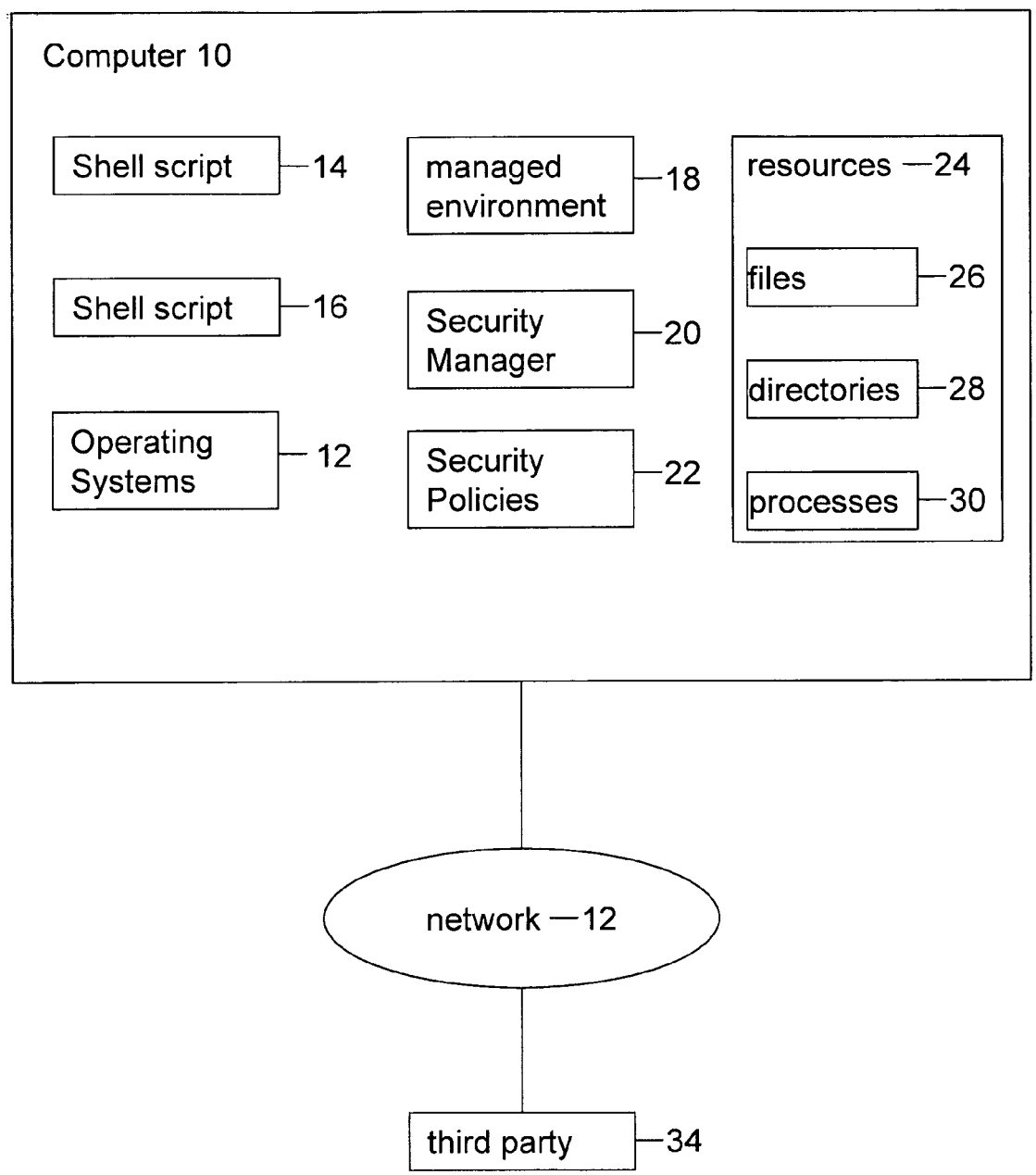
FIG. 1 is a high-level block diagram of a system, according to one embodiment of the invention.

FIG. 1 illustrates a system, according to one embodiment of invention. A computer 10 may include an operating system 12, conventionally known in the art. One or more shell scripts (or programs) may be present on a computer 10. Shell scripts (14, 16) may be downloaded to a computer directory from a third party source 34 through a network connection 32. Other sources may be included (e.g., hard disk, CD, drive storage). The origin of the scripts and program is part of a code identity and may affect how the security manager resolves the security policy. Thus, shell scripts on a computer may originate from various sources that may be secure, un-secure, or semi-secure. Additionally, shell scripts may be programmed in limitless ways to add features to existing application (e.g., automate repetitive tasks) and to create new functions. Many shell scripts may be executed simultaneously. Shell scripts may run as a background process while other applications are running on a computer. For example, a shell script may be programmed to indicate when a hard drive memory falls below a user indicated threshold.

A managed environment 18 may be used for executing shell scripts as a managed shell. A security manager 20 may identify and enforce various security parameters within a dynamically created sandboxed environment. Security parameters may be stored as one or more security policies 22 maintained locally at computer 10 (or remotely at another location). In addition to existing operating system security policies (e.g., user-based identity), additional permissions and policies may be enforced within a managed shell sandbox. Security policy may include one or more permissions for enforcing security parameters. Security permissions may determine what actions can and cannot be performed. A security policy may be created for various objects including, but not limited to, shell tool specific security policies, application specific security policies, resource based security policies, shell based policies, owner based policies, user based policies and/or other types of policies. During execution within a managed shell, a shell script may request access to a resource in order to perform the commands within the script. Resources 24 may include files 26, directories 28, processes 30, and/or other resources. A security manager 20 can enforce the security policy related to a requested resource.

In one aspect, the system can apply more kinds of permissions (e.g., code identity, resources based security) and more permission granularity in addition to the existing, user identity based, security found in current shells. A managed shell may include recognizing the shell commands (e.g., shell tools) as separate entities that have their own security policies. Tool policies are merged with the shells own policies before executing the tools. This way the managed tools themselves can limit the kind of actions they can perform (e.g., a 'rm' command that never deletes backup files). Ever further, a managed shell may recognize the resources (e.g., files, directories, process) and the owners (e.g., applications, users) as separate entities that can also have their own security policies (e.g. only an administrator can delete the backup file).

A managed shell may dynamically create sandboxes based on the tools and resources being requested before launching the execution. This is unlike normal application, even managed application. The shell sandboxes may be supplied with information, for example, the requested tools and resources, and the granted/refused permission sets.

Figure 2:
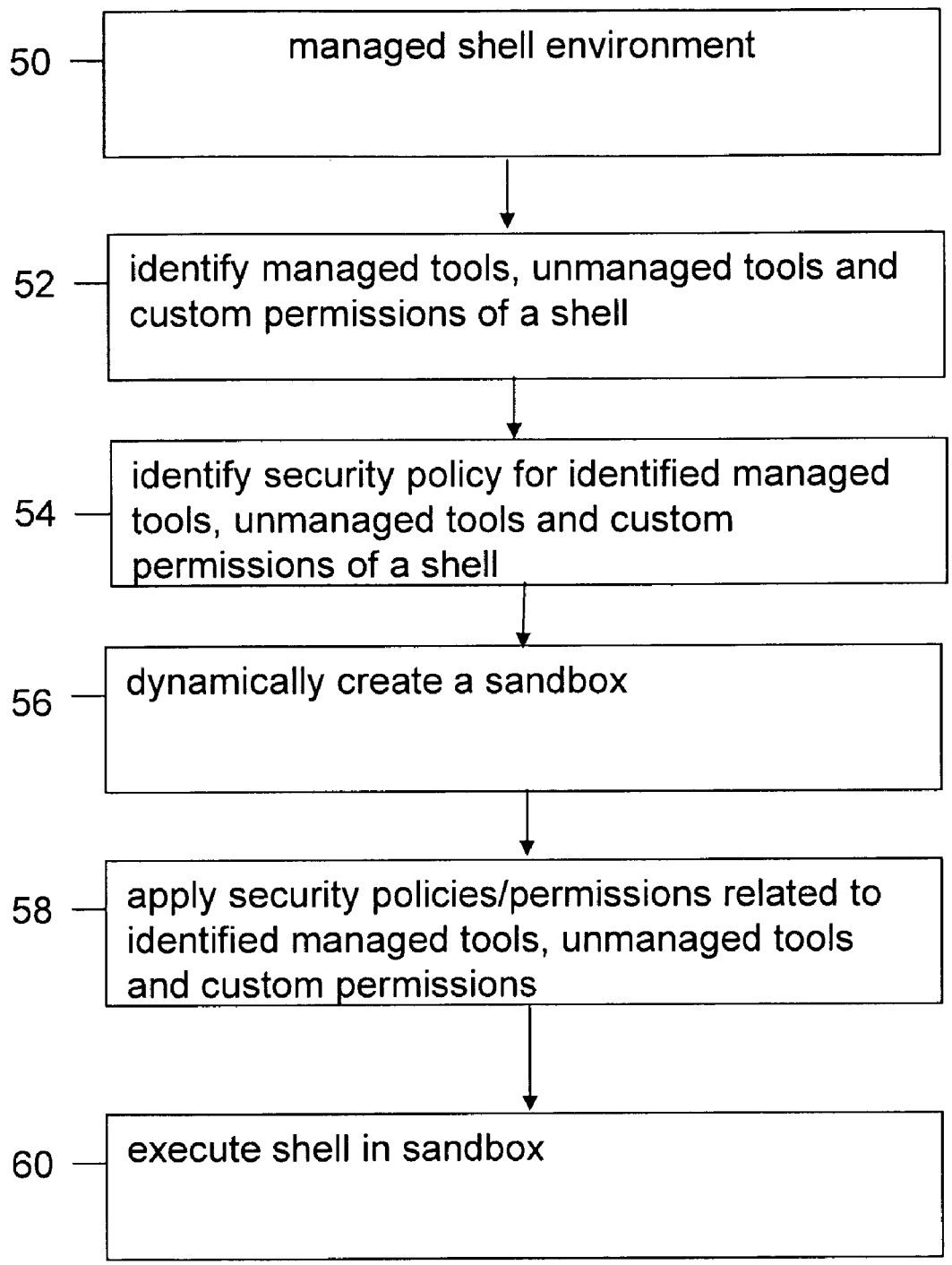
FIG. 2 is a flow chart for a method for creating a sandbox, according to one embodiment of the invention.

FIG. 2 discloses a method for executing a managed shell according to one aspect of the invention. A shell script may be launched automatically without user's knowledge or manually with user initiation. A managed shell may be created at runtime (operation 50) for securely running a shell script (or program). The managed shell may execute managed tools, unmanaged tools, and custom permissions. Managed tools can include general shell tools (e.g. ls, rm, cp, mv), specific application tools (e.g., configuration tools restricted to super users, backup and restore tools), code assemblies and/or other resources. This may allow security policies that are not overly complex or descriptive. For example, a shell could deny access to write to a file if the owning application is currently running.

Unmanaged tools may not have security policies, rather they may be executed if the security policy explicitly allows for it, but once executed a managed shell may not guarantee how the unmanaged code will act.

Custom permissions are managed code libraries that are invoked by the security manager 20 before granting access to a resource. This type of permission may execute specific code to check for more advanced and/or specialized permissions (e.g., application or resource specific permission). For example, custom permissions could do time-based checks to allow or deny certain operations.

Managed tools, unmanaged tools, and/or custom permissions may be identified at runtime (operation 52). Security policies for managed tools may be identified along with security decisions to be made with regard to unmanaged tools (operation 54). Based on the evidences of the tools (e.g., code identity, source, requested permission) and the specified resources, one or more sandboxes may be dynamically created for one or more managed tools and unmanaged tools in order to apply the identified security policies, decisions and permissions as a merged set of rules to be enforced within the one or more sandboxes (operation 56 and 58). The managed shell may be executed according to the merged set of security policies within the one or more sandboxes (operation 60). The creation of sandboxes allows shells to be executed without security risks to other processes and resources of the system. It is possible to create a sandbox inside another sandbox to further restrict the permissions granted on a sub-script (e.g. a trusted script calling another less-trusted script).

One aspect of the invention uniquely addresses the use of multiple sandboxes in a managed shell where commands and resources may be subject to a security manager. This allows application specific security policies to apply for shell commands and also to have shell commands specific security policies while still allowing the "normal" (e.g., user, machine and enterprise security policies) security policies to be applied.

Advanced shell security may be implemented based on the knowledge the shell has of the resources it accesses. This allows security policies to be applied to the resources the shell accesses as well as to managed code. This extends the usage of the security manager 20 by giving it greater awareness during execution. This may also allow managed shell to provide remote and controlled access to a shell (e.g., a script may be sent to another computer to be executed).

Figure 3:
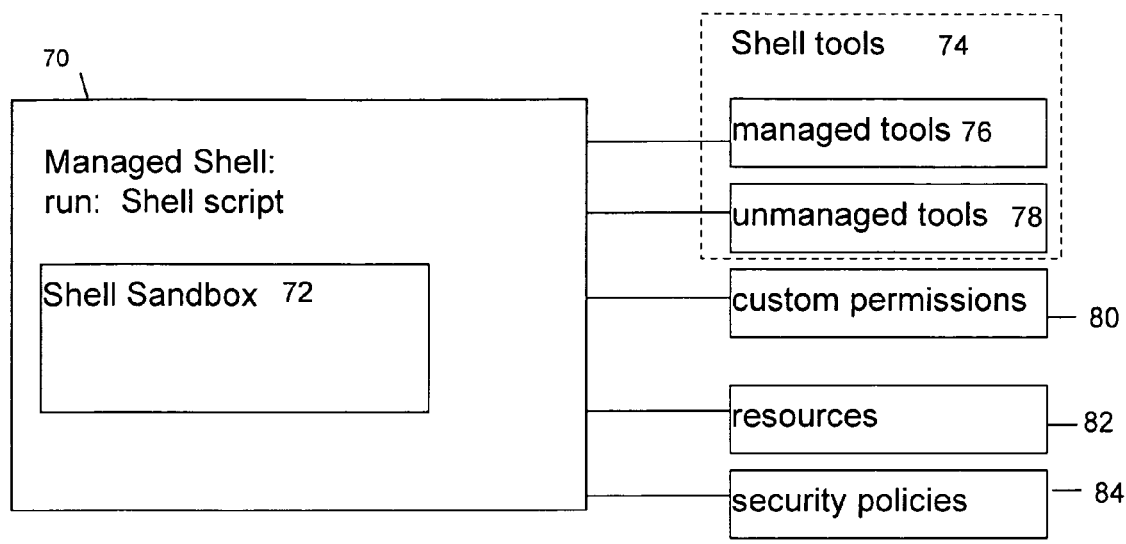
FIG. 3 is a block diagram for a managed shell, according to one embodiment of the invention.

FIG. 3 is a block diagram that further illustrates a managed shell and shell sandbox according to one aspect of the invention. At runtime a shell script (or program) may be executed by a managed shell 70. Various objects are used for the execution of the shell including, but not limited to, shell tools 74, custom permissions 80, application resources 82, and security policies 84. Managed shell may include the use of shell tools 74 including managed tools 76 and unmanaged tools 78, during shell execution. One or more shell sandboxes 72 may be created (e.g., a shell script calling another script) for the one or more managed and unmanaged tools. Instances of security policies 84 may be used in the shell sandbox. The security policy instances may relate to managed tools and requested resources 82 of the managed shell. Custom permissions for a managed shell may be specified for use within the shell sandbox. The combination of security policies from the various aspects of shell execution provides a secure execution that goes beyond the conventional operation system security by dynamically creating a secure execution environment in the form or a sandbox having security policies.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

The invention claimed is:

1. A method for using sandboxes in a managed shell, comprising:

creating a managed environment for executing a shell script on a computer;

executing the shell script in the managed environment on one or more processors associated with the computer, wherein the managed environment includes a first sandbox configured to enforce one or more security policies for the shell script during runtime execution of the shell script in the managed environment;

recognizing at least one shell tool that the shell script requests during the runtime execution in the managed environment, wherein a security manager recognizes the shell tool as an entity separate from the shell script that has one or more additional security policies separate from the one or more security policies for the shell script;

identifying the additional security policies for the recognized shell tool requested by the shell script during the runtime execution in the managed environment;

dynamically creating a second sandbox inside the first sandbox in response to recognizing the at least one shell tool requested by the shell script during the run time execution in the managed environment, wherein the second sandbox is configured to enforce the additional security policies identified for the requested shell tool;

merging the one or more security policies for the shell script with the additional security policies identified for the requested shell tool; and executing the requested shell tool in the managed environment, wherein the managed environment is configured to use the first sandbox and the second sandbox to enforce the merged security policies for the shell script and the requested shell tool.

2. The method of claim 1, wherein the requested shell tool includes a managed shell tool having the additional security policies.

3. The method of claim 2, wherein the managed environment is further configured to enforce the security policies for the shell script and the additional security policies for the managed shell tool in response to the shell script requesting the managed shell tool during the runtime execution in the managed environment.

4. The method of claim 1, further comprising dynamically creating a third sandbox inside the first sandbox in response to recognizing at least one unmanaged shell tool requested by the shell script during the runtime execution in the managed environment, wherein the managed environment is further configured to enforce the security policies for the shell script for the unmanaged shell tool in response to the shell script requesting the unmanaged shell tool during the runtime execution in the managed environment.

5. The method of claim 1, wherein the requested shell tool includes a sub-script that the shell script requests to execute during the runtime execution in the managed environment.

6. The method of claim 1, wherein the requested shell tool includes a resource that the shell script requests access to during the runtime execution in the managed environment.

7. The method of claim 1, wherein the managed environment is further configured to enforce the merged security policies for the shell script and the requested shell tool based on whether the shell script and the requested shell tool originate from a secure source, an un-secure source, or a semi-secure source.

8. The method of claim 1, wherein the merged security policies each include one or more security permissions or security parameters that restrict one or more actions that one or more of the shell script or the shell tool request during the runtime execution in the managed environment.

9. The method of claim 1, wherein the security manager dynamically creates the second sandbox inside the first sandbox prior to executing the requested shell tool in the managed environment.

10. The method of claim 1, further comprising supplying the first sandbox and the second sandbox with one or more granted permission sets and one or more refused permission sets, wherein the first sandbox and the second sandbox use the granted permission sets and the refused permission sets to enforce the merged security policies for the shell script and the requested shell tool.

11. A system for using sandboxes in a managed shell, comprising:

a computer configured to download a shell script through a network connection;

a managed environment configured to execute the downloaded shell script on the computer, wherein the managed environment includes a first sandbox configured to enforce one or more security policies for the shell script during runtime execution of the shell script in the managed environment; and a security manager configured to:

recognize at least one shell tool that the shell script requests during the runtime execution in the managed environment, wherein the security manager recognizes the shell tool as an entity separate from the shell script that has one or more additional security policies separate from the one or more security policies for the shell script;

identify the additional security policies for the recognized shell tool requested by the shell script during the runtime execution in the managed environment;

dynamically create a second sandbox inside the first sandbox in response to recognizing the at least one shell tool requested by the shell script during the runtime execution in the managed environment, wherein the second sandbox is configured to enforce the additional security policies identified for the requested shell tool;

merge the one or more security policies for the shell script with the additional security policies identified for the requested shell tool; and execute the requested shell tool in the managed environment, wherein the managed environment is further configured to use the first sandbox and the second sandbox to enforce the merged security policies for the shell script and the requested shell tool.

12. The system of claim 11, wherein the requested shell tool includes a managed shell tool having the additional security policies.

13. The system of claim 12, wherein the managed environment is further configured to enforce the security policies for the shell script and the additional security policies for the managed shell tool in response to the shell script requesting the managed shell tool during the runtime execution in the managed environment.

14. The system of claim 11, wherein the security manager is further configured to dynamically create a third sandbox inside the first sandbox in response to recognizing at least one unmanaged shell tool requested by the shell script during the runtime execution in the managed environment, wherein the managed environment is further configured to enforce the security policies for the shell script for the unmanaged shell tool in response to the shell script requesting the unmanaged shell tool during the runtime execution in the managed environment.

15. The system of claim 11, wherein the requested shell tool includes a sub-script that the shell script requests to execute during the runtime execution in the managed environment.

16. The system of claim 11, wherein the requested shell tool includes a resource that the shell script requests access to during the runtime execution in the managed environment.

17. The system of claim 11, wherein the managed environment is further configured to enforce the merged security policies for the shell script and the requested shell tool based on whether the shell script and the requested shell tool originate from a secure source, an un-secure source, or a semi-secure source.

18. The system of claim 11, wherein the merged security policies each include one or more security permissions or security parameters that restrict one or more actions that one or more of the shell script or the shell tool request during the runtime execution in the managed environment.

19. The system of claim 11, wherein the security manager is further configured to dynamically create the second sandbox inside the first sandbox prior to executing the requested shell tool in the managed environment.

20. The system of claim 11, wherein the security manager is further configured to supply the first sandbox and the second sandbox with one or more granted permission sets and one or more refused permission sets, wherein the first sandbox and the second sandbox use the granted permission sets and the refused permission sets to enforce the merged security policies for the shell script and the requested shell tool.

* * * * *